(12) United States Patent
Reshef et al.

(10) Patent No.: US 6,584,569 B2
(45) Date of Patent: Jun. 24, 2003

(54) SYSTEM FOR DETERMINING WEB APPLICATION VULNERABILITIES

(75) Inventors: Eran Reshef, Tel-Aviv (IL); Yuval El-Hanany, Tel-Aviv (IL); Gil Raanan, Zoran (IL); Tom Tsarfati, Tel-Aviv (IL)

(73) Assignee: Sanctum Ltd., Herzelia (IL)

( * ) Notice: Subject to any disclaimer, the term of this patent is extended or adjusted under 35 U.S.C. 154(b) by 0 days.

(21) Appl. No.: 09/800,090

(22) Filed: Mar. 5, 2001

(65) Prior Publication Data

US 2002/0010855 A1 Jan. 24, 2002

Related U.S. Application Data

(60) Provisional application No. 60/186,892, filed on Mar. 3, 2000.

(51) Int. Cl.$^7$ .......................... G06F 12/19; G06F 11/30; G06F 17/30
(52) U.S. Cl. .......................... 713/201; 713/202; 709/9; 709/203; 709/219; 709/225; 714/37; 714/38; 714/39; 714/47
(58) Field of Search .............................. 714/37, 38, 39, 714/47; 709/9, 203, 219, 225; 713/201, 202

(56) References Cited

U.S. PATENT DOCUMENTS

| | | |
|---|---|---|
| 5,166,977 A | 11/1992 | Ross |
| 5,237,693 A | 8/1993 | Kiyohara et al. |
| 5,257,369 A | 10/1993 | Skeen et al. |

(List continued on next page.)

FOREIGN PATENT DOCUMENTS

| | | |
|---|---|---|
| EP | 959586 | 11/1999 |
| WO | WO 99/46882 | 9/1999 |
| WO | WO 00/16206 | 3/2000 |
| WO | WO 01/02963 | 1/2001 |
| WO | WO 01/31415 | 5/2001 |

OTHER PUBLICATIONS

Intrusion, Evasion, and denial of Service: Eluding Network Intrusion Dectection, Thomas H. Ptack, et al., Secure Network INC., Jan. 1998.*

A simple Active Attack Against TCP, Laurent Joncheay, Merit Network INC, Apr. 1995.*

Protecting Routing Infrastructures from Denial of Service Using Cooperative Intrusion Detection, Steve Cheung et al., Universit of California, Davis, CA, New Security Paradigms, workshop Cumbria UK, Sep. 1997.*

SAINT: A security Analysis Integration Tool, published in the proceedings of the 1996 SANS Conference, Washington, D.C., May 1996.*

"Design and Implementation of a Security Management System", W. Song et al., IEEE 1995, especially p. 262, section entitled "Simulator".

"Intrusion Detection Alert", K.L. Ida Peterson, IEEE 1992, pp. 306–311.

"Abstraction–Based Misuse Detection: High Level Specification and Adaptable Strategies", J. Lin et al., IEE 1998, Abstract, Figures 1 and 2, entire document.

(List continued on next page.)

Primary Examiner—Gail Hayes
Assistant Examiner—Taghi T. Arani
(74) Attorney, Agent, or Firm—Brown, Raysman, Millstein, Felder & Steiner LLP

(57) ABSTRACT

A method for detecting security vulnerabilities in a web application includes analyzing the client requests and server responses resulting therefrom in order to discover pre-defined elements of the application's interface with external clients and the attributes of these elements. The client requests are then mutated based on a pre-defined set of mutation rules to thereby generate exploits unique to the application. The web application is attacked using the exploits and the results of the attack are evaluated for anomalous application activity.

72 Claims, 9 Drawing Sheets

U.S. PATENT DOCUMENTS

| | | |
|---|---|---|
| 5,347,578 A | 9/1994 | Duxbury |
| 5,392,390 A | 2/1995 | Crozier |
| 5,485,409 A | 1/1996 | Gupta et al. |
| 5,557,798 A | 9/1996 | Skeen et al. |
| 5,559,800 A | 9/1996 | Mousseau et al. |
| 5,566,326 A | 10/1996 | Hirsch et al. |
| 5,611,048 A | 3/1997 | Jacobs et al. |
| 5,623,601 A | 4/1997 | Vu |
| 5,659,547 A | 8/1997 | Scarr et al. |
| 5,673,322 A | 9/1997 | Pepe et al. |
| 5,699,518 A | 12/1997 | Held et al. |
| 5,701,451 A | 12/1997 | Rogers et al. |
| 5,715,453 A | 2/1998 | Stewart |
| 5,724,355 A | 3/1998 | Bruno et al. |
| 5,774,695 A | 6/1998 | Autrey et al. |
| 5,778,189 A | 7/1998 | Kimura et al. |
| 5,793,966 A | 8/1998 | Amstein et al. |
| 5,805,823 A | 9/1998 | Seitz |
| 5,812,763 A | 9/1998 | Teng |
| 5,828,893 A | 10/1998 | Wied et al. |
| 5,850,388 A | 12/1998 | Anderson et al. |
| 5,870,544 A | 2/1999 | Curtis |
| 5,870,559 A | 2/1999 | Leshem et al. |
| 5,881,232 A | 3/1999 | Cheng et al. |
| 5,892,900 A | 4/1999 | Ginter et al. |
| 5,892,903 A * | 4/1999 | Klus .................... 395/187.01 |
| 5,908,469 A | 6/1999 | Botz et al. |
| 5,910,987 A | 6/1999 | Ginter et al. |
| 5,915,019 A | 6/1999 | Ginter et al. |
| 5,917,912 A | 6/1999 | Ginter et al. |
| 5,933,498 A | 8/1999 | Schneck et al. |
| 5,941,947 A | 8/1999 | Brown et al. |
| 5,944,794 A | 8/1999 | Okamoto et al. |
| 5,949,876 A | 9/1999 | Ginter et al. |
| 5,982,891 A | 11/1999 | Ginter et al. |
| 5,983,270 A | 11/1999 | Abraham et al. |
| 6,088,804 A * | 7/2000 | Hill et al. .................... 713/201 |
| 6,185,689 B1 * | 2/2001 | Todd, Sr. et al. ........... 713/201 |
| 6,205,552 B1 | 3/2001 | Fudge |
| 6,219,803 B1 * | 4/2001 | Casella et al. ................ 714/38 |
| 6,249,886 B1 * | 6/2001 | Kalkunte ..................... 714/47 |
| 6,298,445 B1 * | 10/2001 | Shostack et al. ............ 713/202 |
| 6,301,668 B1 * | 10/2001 | Gleichauf et al. .......... 713/201 |
| 6,311,278 B1 * | 10/2001 | Raanan et al. ............. 713/201 |
| 6,408,391 B1 * | 6/2002 | Huff et al. .................. 713/201 |
| 6,415,321 B1 * | 7/2002 | Gleichauf et al. .......... 709/223 |
| 2002/0026591 A1 * | 2/2002 | Hartley et al. .............. 713/201 |

OTHER PUBLICATIONS

"Role Based Access Control: A Multi–Dimensional View", R.S. Sandhu et al., IEEE 1994, Abstract, pp. 54–60.

"An Audit Model for Object Oriented Databases", B. Kogan et al., IEEE 1991, pp. 90–96.

"Developing Secure Systems: Issues and Solutions", J. Freeman et al., IEEE 1998, pp. 183–189.

"Formal Techniques for an ITSEC–E4 Secure Gateway", Pierre Bieber, IEEE 1996, pp. 236–244.

* cited by examiner

| Result | Link | Name | Report | Manual Tamper | Filter | Marked |
|---|---|---|---|---|---|---|
| Evident Success | /scripts/test.pl.bak <br> View Attack Result  Reattack <br> *(Advice mode)* | time script files (Windows) (Severity: Medium) | ⊕ | ▨ | 💣 | ▶ |
| Evident Success | /scripts/test.pl <br> Original parameter: price1=1 <br> Mutated parameter: price1=1 <br> View Attack Result  Reattack <br> *(Advice mode)* | Change Price (to 1) (Severity: High) | ⊕ | ▨ | 💣 | ▶ |
| Evident Success | /scripts/test.pl <br> View Attack Result  Reattack <br> *(Advice mode)* | Forceful Browsing (any directory) (Severity: High) | ⇕ | ▨ | 💣 | ▶ |

SYSTEM FOR DETERMINING WEB APPLICATION VULNERABILITIES

RELATED APPLICATIONS

This application claims priority from U.S. Provisional Application No. 60/186,892 filed on Mar. 3, 2000 which is hereby incorporated by reference into this application.

This application is related to pending U.S. application Ser. No. 09/345,920, entitled Method and System for Extracting Application Protocol Characteristics, filed Jul. 1, 1999, which application is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of Invention

The invention generally relates to the art of detecting security flaws with a web site, and in particular, to detecting vulnerabilities at the application level, as opposed to the network level.

2. Background of Invention

It is often quite important to ensure that a web site or web application is secure from attack or perversion by hackers. In order to assist in this endeavor, network scanning tools exist which provide security management capabilities for network host computers or servers. One example of such a scanner is the Internet Scanner™ marketed by Internet Security Systems, Inc. of Atlanta, Ga., which product appears to be described in U.S. Pat. No. 5,892,903 to Klaus.

The shortcoming with network security products such as the Internet Scanner™ is that they only scan for vulnerabilities at the network level. The goal is to limit access to a web site to only designated protocols and services. To analogize, network-level security products can be thought of as a fence that forces access to the site only through a main gate, and network-level scanners seek to find the holes in the fence.

However, there also exists a need to ensure that a web site or web application is secure at the application level. Many web applications assume or depend that the application user is in fact executing a mobile agent of the application on the user's browser. However, a malicious user can overcome or modify the limitations or logic embedded in the mobile agent and send destructive or forged data to the web server. For example, one common type of web application is an online storefront wherein goods and services can be bought or sold over the Internet. A hacker should not be able to change the sale price of a product by manipulating the HTTP requests sent to the application program executing on a web server. A need therefore exists for an application-level scanner to identify application-level vulnerabilities. In other words, carrying on with the previous analogy, once the user is inside the gate it is important to identify ways in which the user may misbehave while on the premises.

Application level vulnerabilities have traditionally been discovered in a manner similar to looking for bugs in software—through a quality assurance or auditing process. Conventionally, this has been a completely manual process that can devour a significant amount of time. Not only does someone have to review the application line-by-line and understand the code intimately, they also have to try to imagine or anticipate potential security loopholes in the code. This is problematic in and of itself because many web developers lack the expertise and requisite knowledge to properly evaluate and correct application-level security flaws. This, coupled with the ever prevalent speed to market concern of getting new web applications on-line as fast as possible, makes human error in web development unavoidable. Worse yet, web applications are constantly changing and being upgraded while third party vendors are continually issuing patches that need to be implemented. In short, manual auditing processes to find application-level vulnerabilities are not very practical.

SUMMARY OF INVENTION

The invention seeks to provide a scanner for automatically detecting potential application-level vulnerabilities or security flaws in a web application. In the web environment, generally speaking, the application scanner analyzes the messages that flow (or would ordinarily flow) between a client browser and a server hosting the web application in order to discover the structure or elements of the application's interface with external clients. Then, based on a pre-defined set of hacking rules or techniques, the scanner mutates client requests in various ways, thereby generating exploits that will be unique for each web application. These exploits may then be used to attack the web application. The attack is monitored and the results evaluated and reported to the user.

According to one aspect of the invention a method is provided for detecting security vulnerabilities with an application implemented through a client-server architecture. The method comprises actuating the application in order to discover one or more application-level elements of the application's client-server interface; attacking the application by sending one or more client requests to the server in which the discovered elements have been mutated in accordance with pre-defined mutation rules; receiving server responses to the mutated requests and evaluating the responses in order to identify anomalous application activity.

According to another aspect of the invention a method is provided for detecting security vulnerabilities in a HTML-based web application installed on a web server or web application server. The method includes: traversing the application in order to discover and actuate links therein; analyzing messages that flow or would flow between an authorized client and the web server in order to discover elements of the application's interface with external clients and attributes of these elements; generating unauthorized client requests in which these elements are mutated; sending the mutated client requests to the server; receiving server responses to the unauthorized client requests and evaluating the results thereof.

According to another aspect of the invention, a scanner is provided for detecting security vulnerabilities in a HTML-based web application installed on a web server or web application server. The scanner includes a crawling engine, an analysis engine, and an attack engine. The crawling engine traverses through the application in an automatic, manual, or interactive way in order to discover application links. The attack engine analyzes the messages that flow or would flow between an authorized client and the web server. The analysis is carried out in order to discover elements of the application's interface with external clients and attributes of these elements. Based on this information unauthorized client requests are generated in which the application interface elements are mutated. The attack engine sends the mutated client requests to the server; receives server responses to the unauthorized client requests and evaluates the results thereof.

BRIEF DESCRIPTION OF DRAWINGS

The foregoing and other aspects of the invention will become more apparent from the following description of illustrative embodiments thereof and the accompanying drawings which illustrate, by way of example, the principles of the invention. In the drawings:

FIG. 7 is a schematic diagram of an exploitation report.

DETAILED DESCRIPTION OF ILLUSTRATIVE EMBODIMENTS

1. Overview

Figure 1:
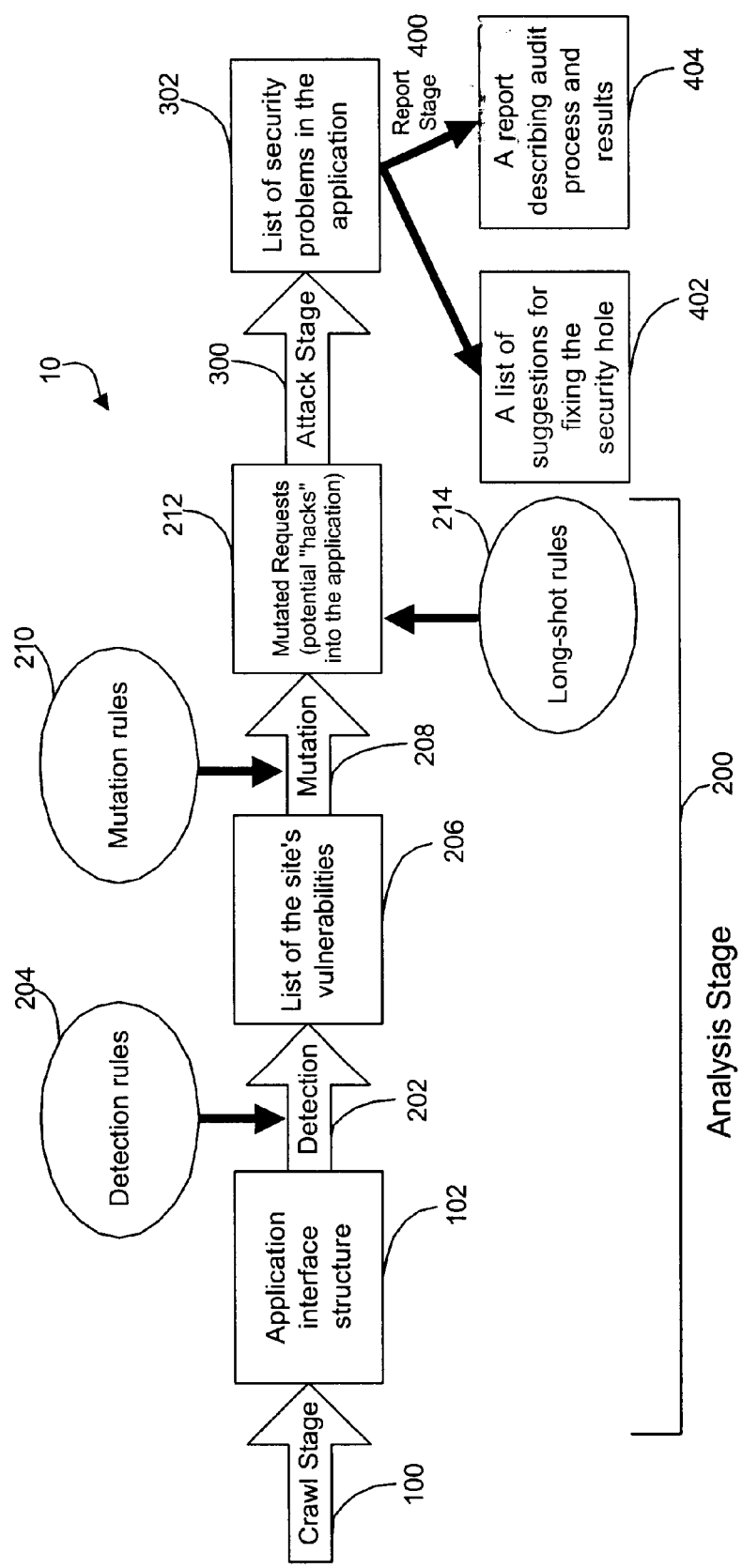
FIG. 1 is a process flow chart illustrating four major stages of operation provided by a web-application scanner according to one embodiment of the invention.

Referring to FIG. 1, the application scanner 10 of the illustrated embodiment employs four stages of operation: a crawl stage 100, an analysis stage 200, an attack stage 300, and a reporting stage 400. Due to the typically expected processing times each stage is preferably initiated manually, but the stages could be automatically actuated if desired.

In the crawl stage 100, the scanner 10 dynamically traverses through an entire web application or site and examines the application-level messages that flow (or would ordinarily flow) between a web server hosting a web-based application and a client browser operating in an intended or authorized way. This enables the scanner to discover the structure or elements of the application's interface with external clients, particularly the path and data parameters employed in the interface. Attributes of the path and data parameters, such as file names and data types are also extracted. Collectively, this provides a description of the application interface (the "application interface structure") 102. If desired, the operator of the scanner may also initiate customizable filters to reduce the crawl path and eliminate scanning any unnecessary or undesired levels, layers or links.

The analysis stage 200 comprises a detection phase 202 followed by a mutation phase 208. In the detection phase 202, the scanner 10 searches through the application interface structure 102 and, using a set of detection rules 204, identifies application-level messages that may be potentially vulnerable to various forms of "hacking". For example, the HTML <form> tag in a web server message may be associated with a numeric input field. In normal operation, the client browser would only accept a numeric input value. However, a hacker may potentially alter this to a non-numeric value when an HTTP request is generated to communicate the value of the field to the server. This minor change has the potential to freeze the application. By iterating through other such detection rules the scanner can thus produce a list of vulnerabilities 206 specific to the web application or web site.

In the mutation phase 208 the scanner 10 uses a set of mutation rules 210 to create mutated HTTP requests 212 such as just described above that will be used to test the web application or web site. The foregoing represents potential "hacks" into the web application or site arising specifically out of the design and structure of the web application or site. In addition, the scanner 10 also preferably includes pre-defined "long shot" rules 214 which are used to create HTTP requests based on published security flaws or vulnerabilities with hardware and/or software platforms that may be employed by the web application or site.

In the attack stage 300 the scanner 10 sends the mutated requests 212 to the site, receives the responses, and ranks the attack results by severity and success ratings. A security problem list 302 is thus generated. If desired, the operator may define the types of attacks to execute and perform them automatically or manually. In the reporting stage 400 the scanner 10 generates a report 404 describing the foregoing auditing process. The scanner 10 preferably also provides a report 402 recommending fixes or other pertinent advice concerning each detected vulnerability. The scanner 10 can thus provide an organization with a repeatable and potentially cost-effective process for conducting application security audits.

2. System Architecture

Figure 2A:
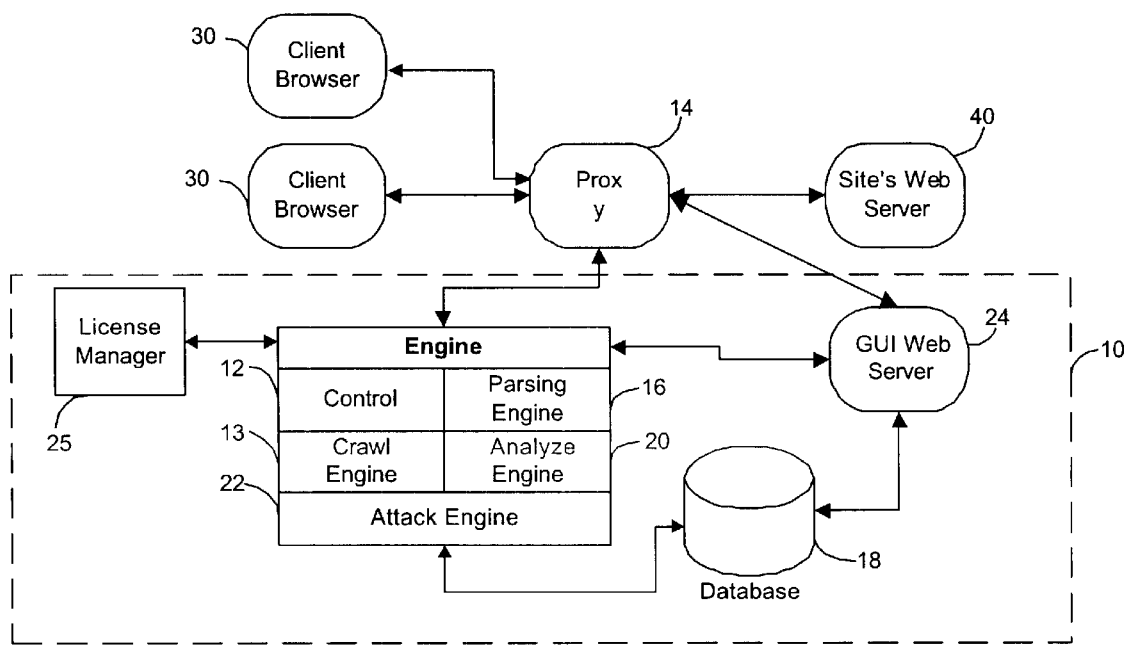
FIGS. 2A, 2B and 2C are system block diagrams showing the major software components of the web-application scanner illustrated in FIG. 1 in accordance with first, second and third methods of implementation, respectively

FIG. 2A shows the system architecture of the scanner 10 in accordance with one implementation method. The major software components comprise:

A control module 12 which controls all other components and communicates with each component.

A crawling engine 13 for crawling over or traversing some or all of the links in the target web site 40. The crawl engine can operate in one of three modes: (i) automatic; (ii) manual; or (iii) interactive. In the automatic mode the engine 13 traverses all links (including, if desired, links embedded in code such as Javascript) which are not removed from consideration by a filter. In the event an HTML form is encountered the engine 13 fills in the form according to pre-defined, configurable values. The engine 13 may also enumerate over multiple values for the same field in a form. For example, in a multiple-choice field the engine 13 will select each of the possible options, and send a separate request in respect of each option to the web site 40. In the manual mode the operator traverses through the web site using a browser and the engine 13 monitors the communication. In the interactive mode, the engine 13 crawls over the links in the same manner as the automatic mode. However, in the event HTML forms or other constructs are encountered which require user interaction, the engine 13 requests the operator to supply the field values.

A proxy 14 that is responsible for communicating messages flowing between a web server 40 hosting the target web application or site and the scanner 10. Note that the scanner 10 may also operate in conjunction with a client browser 30, for instance, to inform the scanner as to which links of the web application should be followed, as described above. In this case, the proxy 14 is configured, as known in the art per se, to intercept messages flowing between the client browser 30 and web server 40 and forward them to the scanner for analysis. After analysis, the scanner 10 forwards the intercepted messages to the intended recipient device. The proxy 14 enables the monitoring of multiple client browsers, as shown in FIG. 2A.

A parsing engine 16, employed in the crawling stage 100, for parsing HTTP messages and the HTML language encapsulated therein in order to discover the application interface structure 102.

A database 18 for storing, among other things, the application interface structure 102 and the site's vulnerabilities 206, the various expert rules 204, 210, 214, the mutated requests 212 and the security problem list 302.

An analysis engine 20, employed in the analysis stage 200, for analyzing the application interface structure 102 as stored in the database 18, applying the detection and mutation rules 204 and 210, and generating the mutated HTTP requests 212.

An attack engine 22, employed in the attack stage 300, for attacking the web application by sending the mutated requests 212 generated in the analysis stage 200 and scoring the result.

A graphic user interface server (GUI) 24 that, in the illustrated embodiment, is a web-based GUI.

A license manager 25 for validating any request going from the scanner 10 to the web site 40 in order to ensure that only licensed web sites will be evaluated.

Figure 2B:
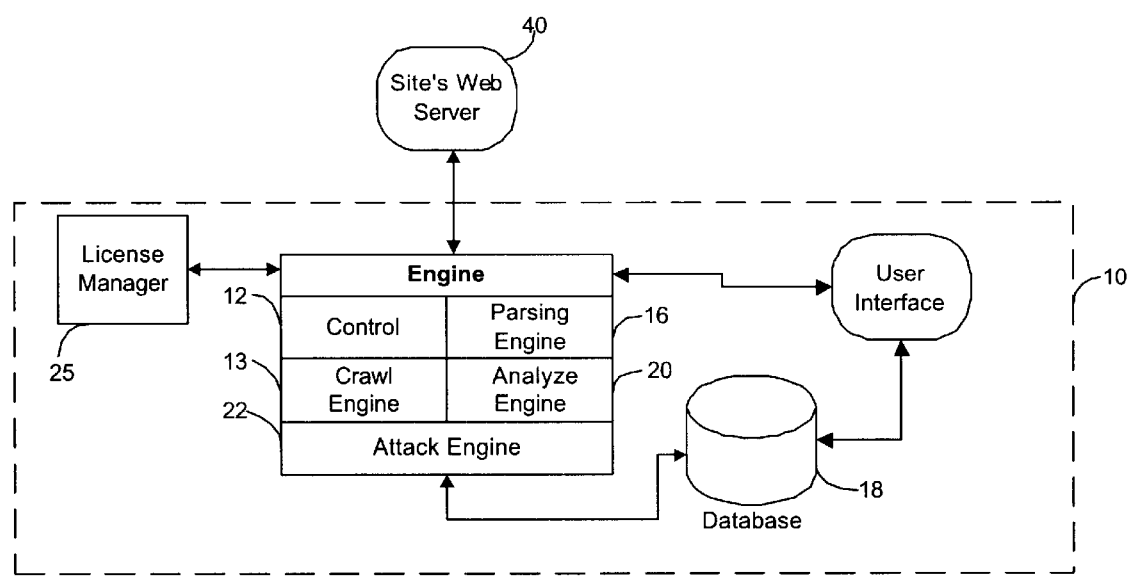

It should be noted that the proxy 14 is just a means to access the web server 40 and could be eliminated so that the scanner 10 communicates directly with the web server 40. This alternative method of implementation is shown in FIG. 2B. In this case the scanner functions as a proprietary client or browser and includes a user interface in place of the GUI server 24.

Figure 2C:
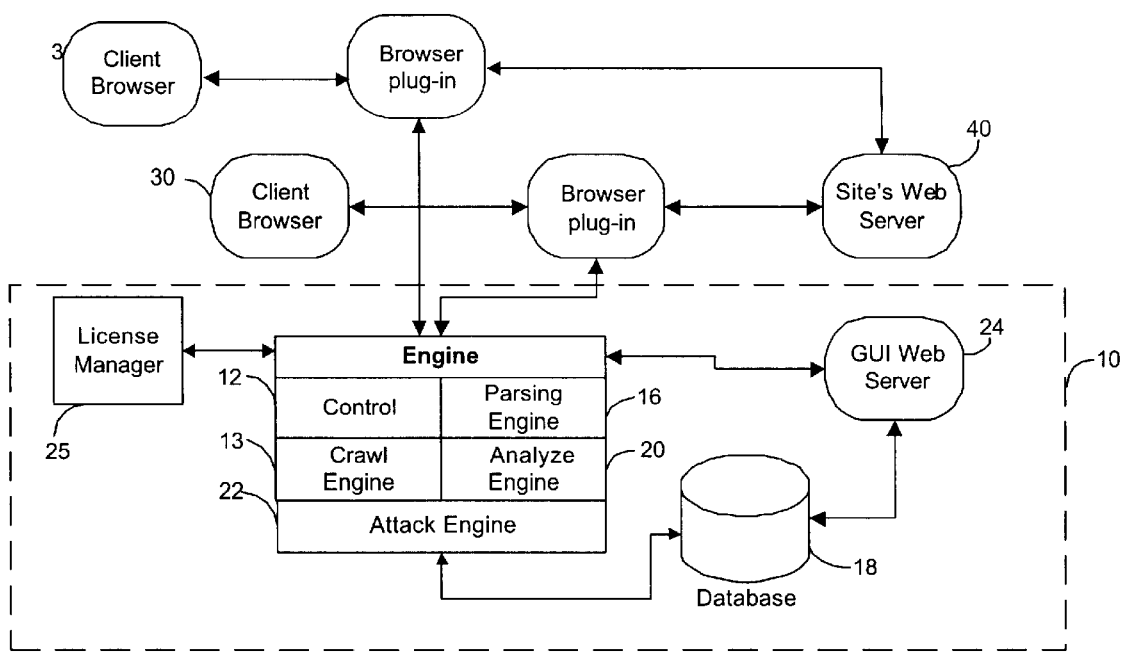

In another alternative method of implementation shown in FIG. 2C, the proxy 14 could be replaced with a browser plug-in as known in the art per se. In this case multiple plug-ins would be required for monitoring communications from multiple browsers.

3. Crawl Stage

The crawl stage 100 may be executed in an automated mode or manual mode. In the automated mode, the crawling engine 13 automatically scans the whole web application or site and discovers all the links or URL's associated therewith. In the process, the scanner identifies the application interface elements associated with each link and stores this information in the database 18.

Figure 3A:
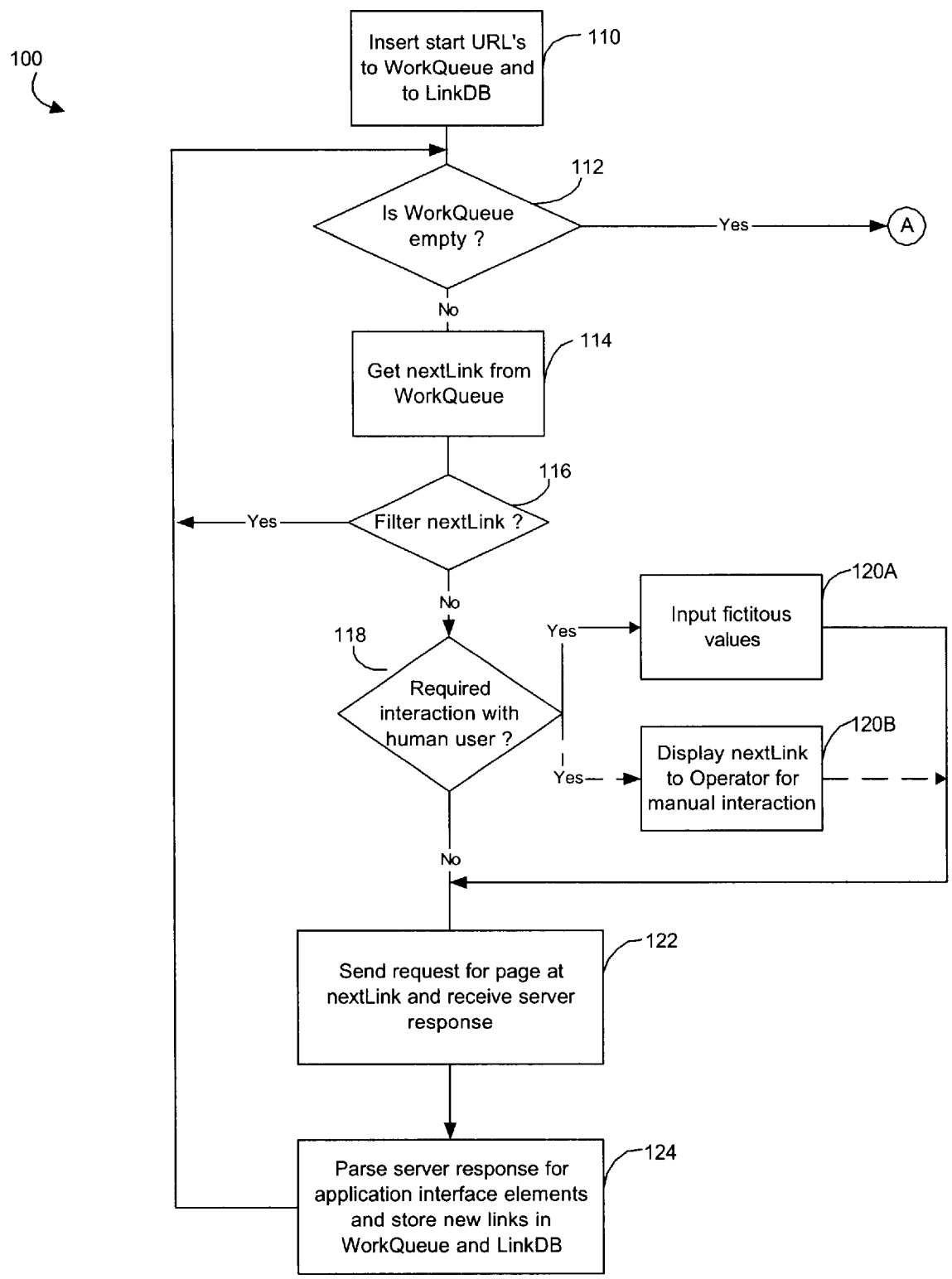
FIGS. 3A, 3B, 3C, and 3D are flowcharts showing the major processing steps executed by the web-application scanner of FIG. 1 in each of the four stages of operation, respectively.

The processing steps carried out by the crawling engine 13 are shown in the flow chart of FIG. 3A. The flowchart references two data structures, WorkQueue and LinkDB, which are stored in the database 18. LinkDB is a log which stores the links that were traversed, as well as the application interface elements associated with each link and the attributes thereof. WorkQueue is temporary data structure for holding all links extracted from a particular web page or server message until such time as the link is processed and logged in LinkDB.

Initial step 110 requests the operator to provide the starting or root URL to the scanner 10. This is stored in WorkQueue and LinkDB.

Step 112 sets up a conditional loop for testing whether or not the WorkQueue is empty. If so, the crawl stage 100 has terminated and the operator may initiate the analysis stage 200.

Step 114 retrieves a link from WorkQueue. The link under consideration is tested at step 116 to see if it matches a pre-defined filter. The filter may be based on the site's domain name so as to prevent the scanner 10 from leaving the web application or site. Other types of filters may be also be employed, such as URL object type matches. For example, a filter based on a '.jpeg' extension may be established to prevent the scanner from following image links. The types of filters may vary and will be application dependent. In the event the link under consideration matches an applicable filter, it is ignored and control passes to step 112.

Step 118 tests whether a web page or portion thereof under consideration (arising from a retrieved link) requires user input. This may occur, for example, when the retrieved web page includes a form. In this event, in order to continue traversing the web application or site, the crawling engine 13 provides fictitious values as input, step 120A, based on the field or data type. In the alternative (as indicated by the dashed flow control line), the engine 13 can operate in the interactive mode wherein the web page is displayed to the operator for manual input, step 120B. (Note that in the first pass of the loop set up by step 112 no web page has been loaded by the scanner, but in subsequent passes a web page or portion thereof is under consideration.)

At step 122, the link under consideration ("nextLink" in FIG. 3A) is actuated and an HTTP request is generated for transmission to the web server. For this purpose the crawling engine 13 functions as an authorized or "correct" client browser as known in the art per se in order to send an authorized or "correct" HTTP request. The web server replies with an HTTP and HTML response that is received by the scanner and loaded into memory. The server response represents a web page or portion thereof pointed to by the actuated link.

The HTTP request is logged in LinkDB. Alternatively, the salient attributes of the HTTP request are stored so that it can be reconstructed at a later time. In particular, any HTTP method, e.g., GET or POST, the requested link or URL, and the method's data parameters are noted.

The HTTP and HTML response is preferably also logged. Using the parsing engine 16, the response is parsed as known in the art per se to extract any path parameters or links encapsulated therein. Provided the extracted links have not already been processed, i.e., not already stored in LinkDB, they are stored in WorkQueue and LinkDB. The response is also parsed to identify other application interface elements (in addition to the encapsulated links) such as data parameters. Attributes of the path and data parameters are also extracted and logged in LinkDB. For example, the parser identifies any input or hidden fields such as those associated with HTML forms. The identity and nature of the field, including its name, type and field length is extracted and logged in LinkDB. Using a similar procedure, the scanner also check for forms, fields, fixed fields, hidden fields, menu options, DOM components, etc. The nature and attributes of these elements are written into LinkDB. The parser also identifies any other actions available in the web document/response. These include, for example, a "submit" command on an HTML form, a "search" command, or other application-level protocols. These additional actions encapsulated within the response are also extracted and stored in LinkDB. In a similar manner the parsing engine 20 identifies any other request-generating tags or the attributes thereof. By traversing through the links within the application the end result is a description of the application's interface with external clients.

In the manual mode, the operator can "walk through" the web application or site using the client browser 30. This allows the operator to manually specify the application links that he or she wishes to traverse. The requests from the browser are directed to the proxy 14 which forwards them onto the scanner 10 for analysis and logging. Once this process is accomplished the scanner forwards the request to the web server via the proxy. The web server receives the request, activates the needed application components, and returns the response to the proxy. The proxy passes the response to the scanner for analysis and stores any discovered interface elements and the attributes thereof into the database 18. In this way the scanner can discover the structure of the portion of the application interface that was encountered during the operator's session with the scanner. The scanner can then attack and test the application based on this information.

4. Analysis Stage 4.1. Detection Phase

The scanner 10 enables the detection and assessment of security vulnerabilities within the web site. As described previously, there are two major categories of web site vulnerabilities. The first major category is unknown or application specific vulnerabilities—security holes within the site's own specific application. These arise from the application-level interface with external clients and include, but are not limited to, path vulnerabilities and parameter vulnerabilities. These are identified in the detection phase 202 by rules 204 (FIG. 1). The second major category is known vulnerabilities—security flaws within 3rd party applications such as web servers, operating systems and packaged or off-the shelf software platforms. Since these vulnerabilities are not application-specific they are not identified in the detection phase 202. Instead, the long-shot rules 214 (FIG. 1) handle these types of vulnerabilities.

4.1.1. Parameter Vulnerabilities

Web applications interface with external clients using a multitude of parameters. These parameters are used to call, initiate or trigger various functions, actions or logic of the application. Each such parameter may have a number of attributes such as data type, length, visibility, and value. The web application may be developed in any one of a vast option of languages (such as Perl, PHP, Java and many others) and may use one or more integration methods (CGIs, servlets, server APIs, etc.). Irrespective of implementation, the application may expect to receive the "correct" parameter containing the "correct" type and value ranges. Any deviation from the expected parameters might potentially lead to erroneous application activity and a wide variety of potential hazards.

Figure 4:
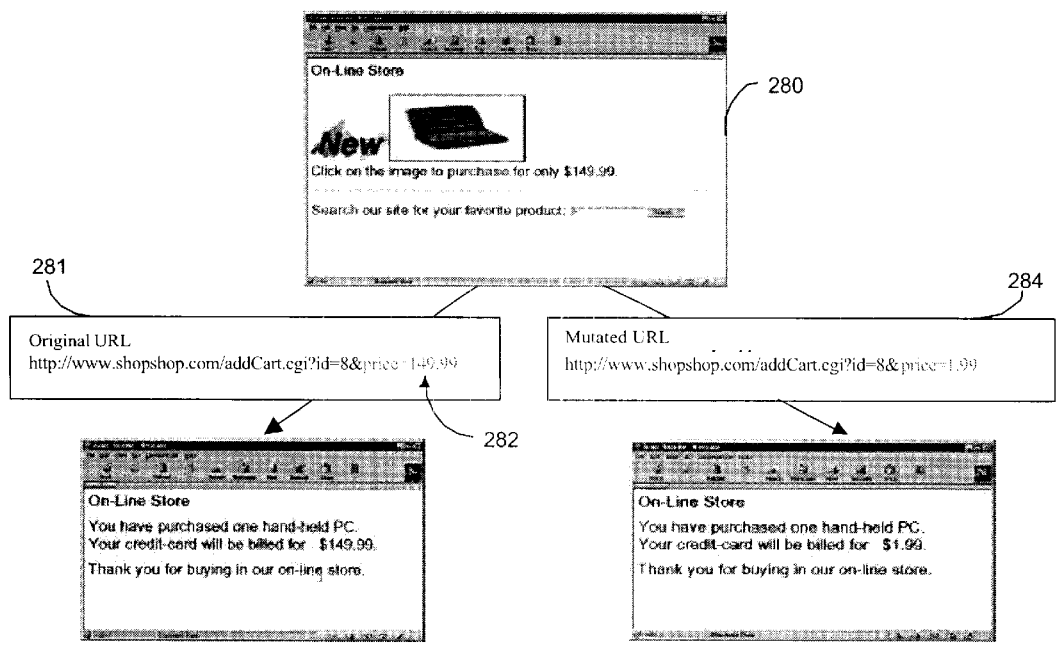
FIG. 4 exemplifies a security vulnerability that may arise in a web application due to a data parameter inherent in the application's external interface.

To demonstrate parameter vulnerabilities, an example of online theft is shown in FIG. 4. In this example a form 280 for purchasing a product contains the product price in a hidden parameter 282. The left part of the figure shows the "appropriate" URL including price parameter that the browser creates from the form 280 leading to the correct acquisition of the product for the sum of $149.99. The link including URL-encoded price parameter would ordinarily be sent in an HTTP request 281 to the server as the path and data parameters of the GET method. The scanner 10 is capable of identifying such a vulnerable HTTP request and changing the value of the vulnerable parameter 282 to create a mutated HTTP request 284 in which the value of the price parameter is changed to 1.99. The security flaw is exposed as a result of sending the mutated request to the web server, resulting in the ability to buy the product at any given price (in this case $1.99).

While a hidden field is one kind of parameter, other examples of parameters include, but are not limited to:
  Input fields associated with HTML forms
  Query parameters that are being passed in the URL (and not in an HTML form)
  HTTP headers
  Cookie values
It is specifically within the scope of the present application to vary the particular parameters detected by the scanner, especially in view of the rapid introduction of new Internet communication standards.

4.1.2. Path Vulnerabilities

The file system shown by the web server to the clients is vulnerable to unauthorized access. Basically, any place in the file system that is left unguarded may serve as an illegal entry point into the system. The possibility of accessing unattended files and directories enables reading old and backup files, listing of directory content and access to hidden applications. These types of vulnerabilities are referred to as path vulnerabilities.

Figure 5:
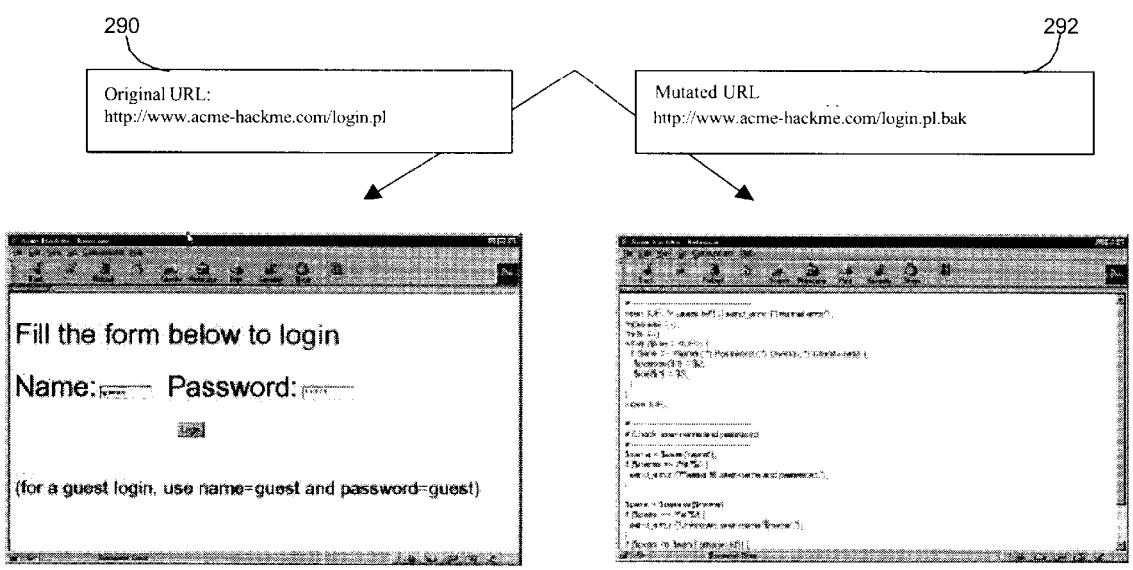
FIG. 5 exemplifies a security vulnerability that may arise in a web application due to a path parameter inherent in the application's external interface.

Access to a hidden part of the file system and a severe breach of security arising from it can be seen in the following example shown in FIG. 5. In this example an old version of a CGI script was left in the file system for backup purposes but its access attributes were not changed to block access. The figure shows an untampered URL 290 that allows normal access to the application via a login.pl CGI script. However, this URL can be identified as a CGI link and a ".bak" suffix may be added to it to create a tampered URL 292. Sending the tampered URL to the web server in a mutated HHTP request exposes the source of the backup file that was left in that directory. The ability to view the source of the script can be a significant security flaw since it may lead to full exposure of the site's vulnerabilities.

4.1.3. Long-shot Vulnerabilities

Long-shot vulnerabilities are security flaws that generally exist within web servers, application servers and other applications interacting with client browsers. The vulnerabilities are published by a large number of organizations (e.g. BugTraq by SecurePoint.COM, Security Focus) and can be accessed by anybody with Internet access. After the hacker checks the vulnerabilities, he or she can scan through a web site trying to find places where the vulnerability has not been blocked or a patch has not been applied. The scanner 10 preferably maintains an updated list of known vulnerabilities in the long shot rules 214. During the mutation phase the scanner enumerates the relevant vulnerabilities according to the type of web server, application server and other third party applications identified by the operator, thus verifying that the known holes in the system are blocked.

4.1.4. Processing Steps

Figure 3B:
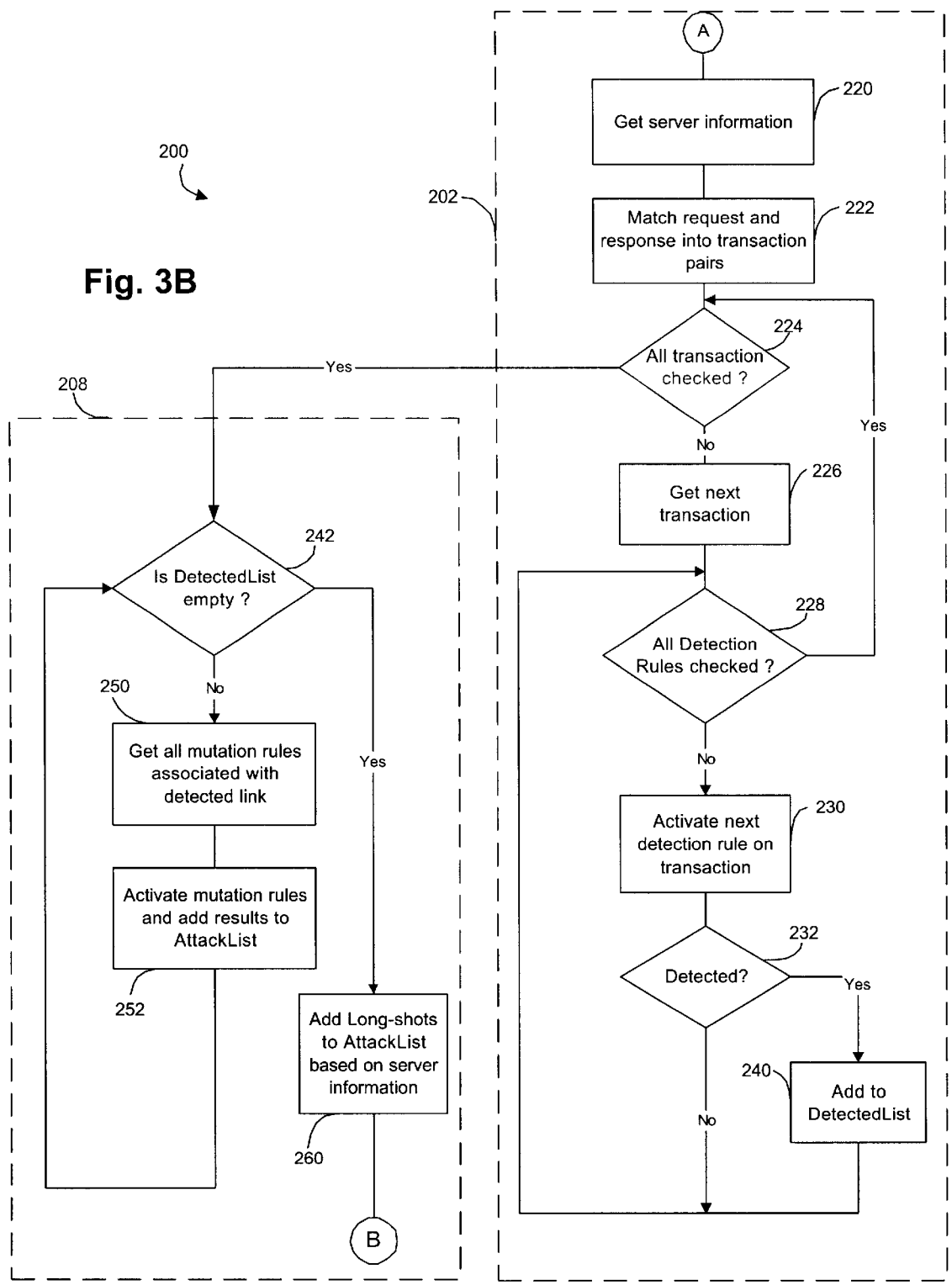

The processing steps carried out by the analysis engine 20 during the detection phase 202 are shown in the flowchart of FIG. 3B.

At initial step 220 the analysis engine 20 collects pertinent information about the web server hardware and software platforms from the operator. Alternatively, this data can be extracted automatically based on fingerprints in a server response.

Figure 6:
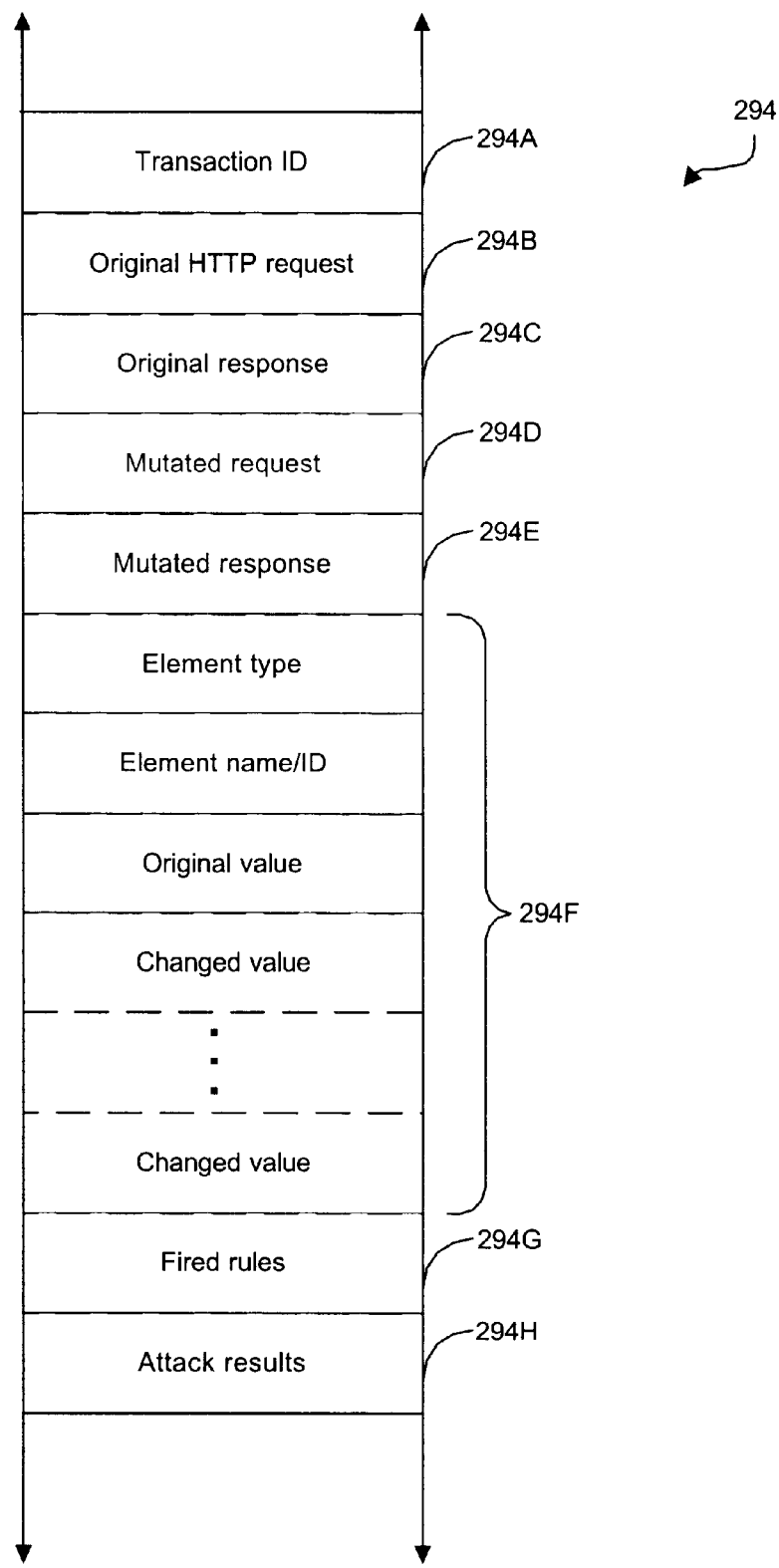
FIG. 6 is a schematic diagram of a data structure for storing the particulars of client-server transactions.

At step 222, the analysis engine 20 scans the LinkDB log in order to match each client request with a server response from which the request was generated. (Recall that each client request is generated from a prior server message.) The server response provides information about the attributes of the data parameters and path parameters used to interface with the web application. This information is used to mutate the previously stored request as described in greater detail below. A matched request and response pair is referred to herein as a "transaction" and stored in a transaction file. A simplified example of a transaction file is shown in FIG. 6. Each record 294 in the file, which may be constructed as an indexed linked list, comprises:

a transaction ID 294A;

the original authorized or correct HTTP request 294B (or reference to it in the LinkDB);

the original HTTP+HTML response 294B (or reference to it in the LinkDB);

mutated HTTP request 294D;

HTTP+HTML response resulting from the mutated request ("mutated response") 294E;

a list 294F of changed application interface elements, including element type (i.e., path or parameter), element name/ID, original value, and mutated value;

fired rules 294G (as described in greater detail below); and attack results 294H (as described in greater detail below).

A conditional loop is established at step 224 for iterating through all the transactions identified in the previous step. When all transactions have been processed the detection phase 202 has terminated and the analysis engine 20 may begin executing the processing steps 242–260 associated with the mutation phase 208.

At step 226 one transaction is read or retrieved from the transaction file. The analysis engine then iterates through all the detection rules 204 to see if any of them apply to, or are "fired" by, the transaction under consideration. Step 228 establishes a nested conditional loop for this purpose. In the nested loop, steps 230 and 232 apply or test one of the detection rules 204 against the transaction under consideration. Representative detection rules include, but are not limited to, identification of transactions that incorporate: (a) a hidden field; (b) a numeric field; (c) a text field; (d) a command; (e) user-selectable input options; (f) a "/scripts" directory in the URL; (g) a "/script/[command names].cgi" in URL, where [command names] are various pre-defined guesses. Rules (a)–(e) are examples of parameter vulnerability detection rules and rules (f)–(g) are examples of path vulnerability detection rules. If the rule is true or "fired", e.g., the transaction involves a hidden field, the analysis engine updates field 294G in the corresponding transaction file record 280 with the ID of the fired rule. At the end of the detection phase, the transaction file will include a list of detected rules (the "detected list").

In practice, because the detection rules for each type of parameter tend to have a similar structure, they can be organized in an SQL database. This makes it convenient to search for multiple rules in a single SQL query in steps 230 and 232.

4.2. Mutation Phase

In the mutation phase 208, the potential security vulnerabilities itemized in the detection list are evaluated and one or more mutations is generated for each detected vulnerability based on the mutation rules. These represent exploits that are unique to the application. The types of mutations correspond to the types of detection rules. An example of this is set out in Table 1.

TABLE 1

| Detection Rule Fired By: | Mutation Rule |
| --- | --- |
| Text field parameter | Change parameter value to %00 (NULL) |
| | Increase string length beyond maxlength attribute |
| Numeric field parameter | Increment parameter value |
| | Decrement parameter value |
| | Multiply parameter value by −1 |
| | Change parameter value to %00 (NULL) |
| | Change parameter value to text type |
| SQL query parameter | Change value to 'show' |
| | Change value to 'search' |
| | Change value to 'delete' |
| | Change value to 'edit' |
| Parameter name = 'file' | Change value to '/boot.ini' |
| | Change value to '/etc/passwd' |
| Path parameter | Append '~' to path |
| | Append '.sav' to path |
| | Append '.bak' to path |
| | Append '.old' to path |
| | Break path into sub-paths (e.g., a/b/c.html will generate: /c.html; and /a/c.html) |

The foregoing are just representative detection and mutation rules and it is specifically within the scope of the invention to implement a wide variety of rules.

The processing steps carried out by the analysis engine 20 during the mutation phase 208 are shown in the flowchart of FIG. 3B. Step 242 establishes a conditional loop for iterating through the transaction file and the list of detected vulnerabilities embedded therein. For each transaction, step 250 retrieves the mutation rules 210 associated with each detection rule that was fired relative to that transaction. Based on these mutation rules, step 252 creates one or more mutated HTTP requests 212 for the transaction. The mutated requests are stored a separate data structure termed AttackList and referenced in field 294D of the transaction file.

Step 260 adds additional unauthorized HTTP requests to AttackList based on the non-application specific long shot rules 214.

5. Attack Stage

The result of the prior stages is a list of mutated requests or exploits (stored in AttackList) that can potentially cause security errors within the application. The mutated requests may be initiated automatically or manually during the attack stage 300 to evaluate the real threat that the potential vulnerabilities pose. Since the attack list can be quite large, the attack engine 22 preferably grants the operator the ability to select the general types of vulnerabilities to execute, or specific attacks to filter out.

Figures 3C, 3D:
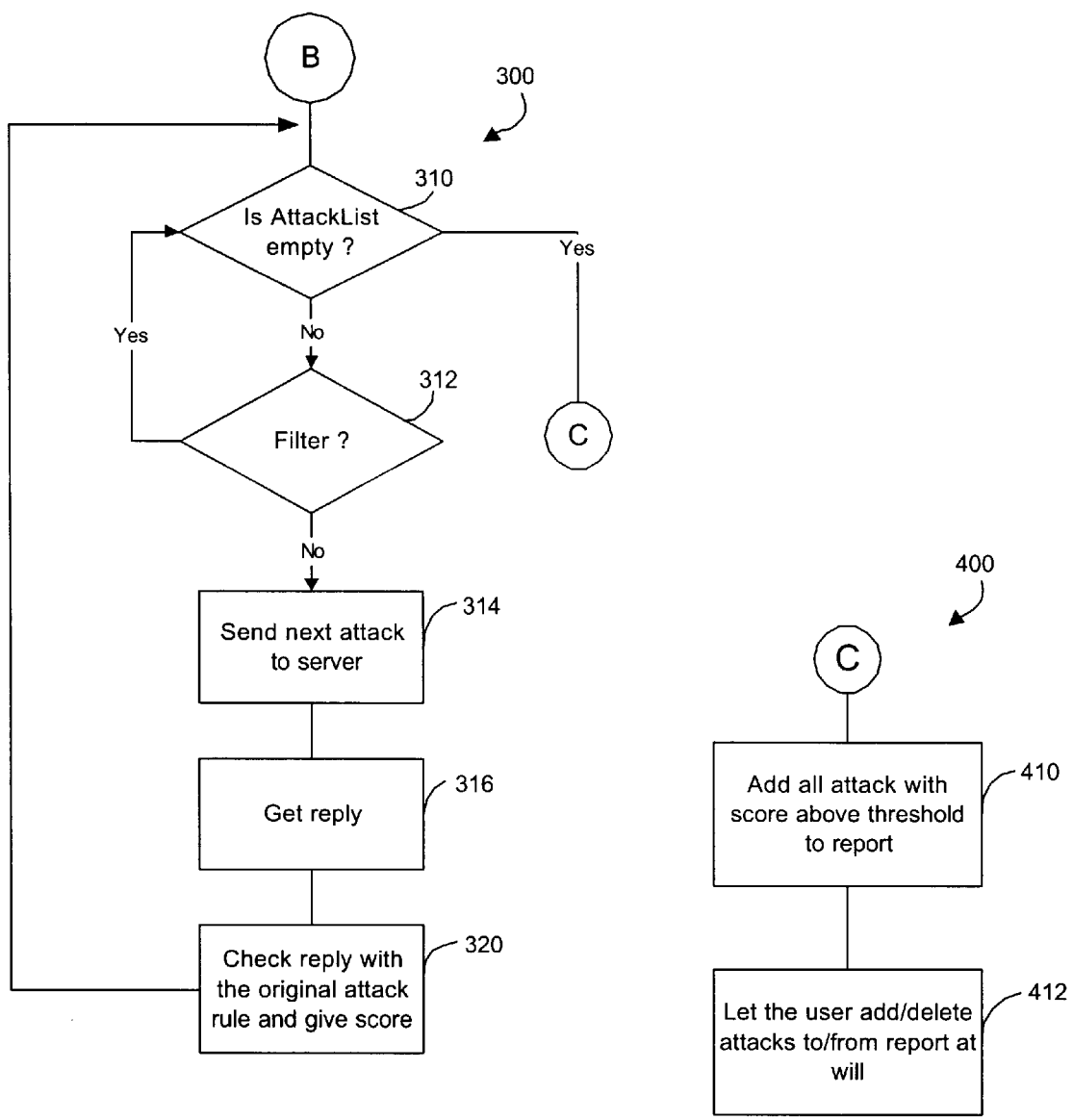

FIG. 3C shows the processing steps carried out by the attack engine 22 in the automated mode. Step 310 sets up a conditional loop for iterating through the AttackList. Step 312 determines whether a particular mutated request has been filtered out. At step 314 a mutated request on the attack list is sent to the application and the server reply is received at step 316 and stored or referenced in field 294E of the transaction file. At step 320, the attack engine 20 analyzes the response received from the application and a success rating and severity are assigned to the potential vulnerability. This is stored in field 294H.

The success rating is preferably based on the recognition of certain keywords in the response. For example, the status line of the HTTP response may include a 4xx result that indicates some kind of error. Alternatively, the application may send a web page back in which the keyword "error", "sorry" or "not found" appears. In these cases the application appears to have withstood the attack since an error was trapped in the mutated client request. However, if these pre-defined keywords are not present, then an assumption is made that the attack was successful. In this manner, any anomalous activity of the application or the lack thereof can be used to evaluate the success or failure of an attack.

The attack score is preferably based on an a priori success probability assigned to each mutation rule. The lower the probability of the vulnerability, the higher the score given to the attack results, unless the attack appears to be unsuccessful in which case it has no score or a zero score.

In the manual attack mode, the scanner preferably enables the operator to browse through the different exploits via their associated links or URLs and select particular ones to attack the application with. In this case the success or failure of the attack can be manually ascertained.

In addition to analyzing the attack responses, the scanner preferably also automatically locates and marks any potentially harmful information in the server responses that may potentially be used to hack into server-side systems. This information, which is based on the recognition of certain tags and/or keywords, is displayed in a "content review" page and may include hidden web page elements such as suspicious text comments, JavaScript code and CGI parameters. Hackers can use these elements to hack into a site by viewing the source code, which may yield important pieces of information about the site that may assist in their hacking attempts.

6. Reporting Stage

FIG. 3D shows the processing steps in the reporting stage 400. At step 410 attack results having scores above a specified threshold are reported to the operator. At step 412 the operator is preferably given the option of adding or deleting attacks to or from the report. An example report 450 provided through the web-based GUI 24 is shown in FIG. 7. In the report the original link to which a client request is shown and the mutation to the URL, if readily apparent, is shown in bold (or red). The results of the attack, stored in the transaction file, are preferably viewable by engaging the "View Attack Result" hyperlink. The "Name" column describes the attack according to predefined categories."

The scanner preferably includes an expert knowledge base for providing advice upon ways of correcting the security flaws exposed by the mutated requests. The suggestions made by knowledge base comprise changes to the site's software or available patches to the problem in cases of third-party platforms. Pressing the "report" icon in FIG. 7 preferably triggers this.

7. Variants

In the illustrated embodiment there are two distinct processes for discovering the structure of the web application's interface with external clients, i.e., the crawl stage, and identifying the elements of the application interface which are susceptible of mutation, i.e., the detection phase of the analysis stage. This is convenient because the crawl stage is useful for determining the application's security policy as described in greater detail in commonly assigned application Ser. No. 09/345,920. However, those skilled in the art will readily appreciate that it is possible to collapse the two processes together in order to identify mutable application interface elements in a single pass.

Furthermore, in the illustrated embodiment each stage of operation is executed prior to the next stage being initiated. In alternative embodiments, the stages of operation may be compacted together and executed sequentially per transaction. For example, a loop may be set up in which, as soon as the crawling engine retrieves a new link, the mutated client request is generated, the web site is attacked and the result evaluated. In still further variant, the scanner can be constructed as a multi-threaded application in which each of the stages of operation are executed in parallel. Numerous other modifications and variations may also be made to the embodiments described herein without departing from the spirit or scope of the invention.

We claim:

1. A method for detecting security vulnerabilities in a web application executing on a web server or web application server, the method comprising:
   actuating the application in order to discover pre-defined elements of the application's interface with external clients;
   generating client requests having unauthorized values for said elements in order to generate exploits unique to the application;
   attacking the application using the exploits; and
   evaluating the results of the attack.

2. The method according to claim 1, wherein an application interface element is a path parameter.

3. The method according to claim 1, wherein an application interface element is a data parameter.

4. The method according to claim 1, wherein the actuation of the application includes:
   sending an authorized client request in order to receive a server response;
   parsing the response in order to discover links encapsulated therein; and
   actuating discovered links in accordance with authorized client functionality in order to generate additional authorized client requests.

5. The method according to claim 4, including comparing discovered links to a filter and not generating authorized client requests for links matching the filter.

6. The method according to claim 4, including logging the client requests.

7. The method according to claim 4, wherein said application interface elements are discovered by parsing at least one of the authorized client requests and server responses resulting therefrom.

8. The method according to claim 7, including analyzing the server responses in order to extract attributes of said application interface elements.

9. The method according to claim 8, wherein the discovery of said application interface elements is based on a pre-defined set of detection rules.

10. The method according to claim 9, wherein the generation of the unauthorized client requests is based on a pre-defined set of mutation rules.

11. The method according to claim 10, wherein the evaluation of the attack results is based on recognition of a keyword in the results of the attack indicating an error in the application activity.

12. The method according to claim 11, including assigning each mutation rule a probability of success and scoring the results of said attack based on the probability of the corresponding mutation rule.

13. A method for detecting security vulnerabilities in a hypertext-based web application installed on a web server or web application server, the method comprising:
   traversing the application in order to discover and actuate links therein;
   analyzing messages that flow or would flow between an authorized client and the web server in order to discover elements of the application's interface with external clients and attributes of said elements;
   generating unauthorized client requests in which said elements are mutated;

sending the mutated client requests to the server; and receiving server responses to the unauthorized client requests and evaluating the results thereof.

14. The method according to claim 13, wherein an application interface element is a path parameter.

15. The method according to claim 13, wherein an application interface element is a data parameter.

16. The method according to claim 13, wherein an application interface element is a cookie.

17. The method according to claim 13, wherein the traversal over the application includes the steps:

sending an authorized client request in order to receive a server response;

parsing the response in order to discover links encapsulated therein; and actuating discovered links in accordance with authorized client functionality in order to receive authorized server responses from which additional authorized client requests can be generated.

18. The method according to claim 17, including comparing discovered links to a filter and not generating authorized client requests for links matching the filter.

19. The method according to claim 17, wherein, in the event the authorized client request requires user-interactive parameters, supplying pre-configured values therefor.

20. The method according to claim 17, wherein, in the event the authorized client request requires user-interactive selection of an option within a set of options, enumerating over all the options in order to generate a separate client request in respect of each option.

21. The method according to claim 17, including logging the authorized client requests.

22. The method according to claim 21, including logging the authorized sever responses.

23. The method according to claim 17, wherein said application interface elements are discovered by parsing at least one of the authorized client requests and server responses resulting therefrom.

24. The method according to claim 23, including analyzing the server responses in order to extract attributes of said application interface elements.

25. The method according to claim 24, wherein the discovery of said application interface elements is based on a pre-defined set of detection rules.

26. The method according to claim 25, wherein the generation of the mutated client requests is based on a pre-defined set of mutation rules.

27. The method according to claim 26, wherein the evaluation of the server response in reply to the mutated requests is based on recognition of a keyword in the results of the attack indicating an error in the application activity.

28. The method according to claim 27, including assigning each mutation rule a probability of success and scoring the results of the server response based on the probability of the corresponding mutation rule.

29. The method according to claim 13, including parsing the messages sent by the server for any suspicious code based on the recognition of pre-defined keywords and reporting the suspicious code.

30. A scanner system, provided on a computer, for detecting security vulnerabilities in a HTML-based web application installed on a web server or web application server, the scanner system comprising:

a crawling engine for traversing the application in order to discover and actuate links therein;

an analysis engine for analyzing messages that flow or would flow between an authorized client and the web server in order to discover elements of the application's interface with external clients and attributes of said elements and for generating unauthorized client requests in which said elements are mutated; and an attack engine for sending the mutated client requests to the server;

receiving server responses to the unauthorized client requests and evaluating the results thereof.

31. The scanner system according to claim 30, wherein the crawling engine:

sends an authorized client request in order to receive a server response;

invokes the parsing engine to parse the response in order to discover links encapsulated therein; and actuates discovered links in accordance with authorized client functionality in order to receive authorized server responses from which additional authorized client requests can be generated.

32. The scanner system according to claim 31, wherein the crawling engine compares discovered links to a filter and does not generate authorized client requests for filtered links.

33. The scanner system according to claim 31, wherein, in the event the authorized client request requires user-interactive parameters, the crawling engine supplies pre-configured values therefor.

34. The scanner system according to claim 31, wherein, in the event the authorized client request requires user-interactive selection of an option within a set of options, the crawling engine enumerates over all the options in order to generate a separate client request in respect of each option.

35. The scanner system according to claim 31, wherein the crawling engine logs authorized client requests and authorized sever responses.

36. The scanner system according to claim 30, wherein the discovery of said application interface elements is based on a pre-defined set of detection rules.

37. The scanner system according to claim 36, wherein the generation of the mutated client requests is based on a pre-defined set of mutation rules.

38. The scanner system according to claim 30, wherein the evaluation of the server response in reply to the mutated requests is based on recognition of a keyword in the results of the attack indicating an error in the application activity.

39. The scanner system according to claim 38, wherein each mutation rule is assigned a probability of success and the attack engine scores the results of the server response based on the probability of the corresponding mutation rule.

40. The scanner system according to claim 30, wherein the attack engine parses the messages sent by the server for any suspicious code based on the recognition of pre-defined keywords and reports the suspicious code.

41. A crawling engine, provided on a computer, provided on a computer, for automatically traversing a hypertext-based web site, comprising:

means for sending a client request in order to receive a server response;

means for parsing the response in order to discover links encapsulated therein;

means for actuating one or more discovered links in accordance with authorized client functionality in order to receive one or more server responses from which one or more additional client requests are generated; and means for automatically supplying values to user-interactive parameters in the additional client requests, if required.

42. The engine according to claim 41, including means for comparing discovered links to a filter and not generating client requests for filtered links.

43. The engine according to claim 41, including means for generating a separate client request in respect of each option in a construct in the server response that requires user-interactive selection of an option within a set of options.

44. A computer program product comprising a computer readable medium having computer readable code embodied therein, the computer readable code, when executed, causing a computer to implement a method for detecting security vulnerabilities in a web application executing on a web server or web application server, the method comprising:

actuating the application in order to discover pre-defined elements of the application's interface with external clients;

generating client requests having unauthorized values for said elements in order to generate exploits unique to the application;

attacking the application using the exploits; and evaluating the results of the attack.

45. The computer program product according to claim 44, wherein an application interface element is a path parameter.

46. The computer program product according to claim 44, wherein an application interface element is a data parameter.

47. The computer program product according to claim 44, wherein, in the implemented method, the actuation of the application includes:

sending an authorized client request in order to receive a server response;

parsing the response in order to discover links encapsulated therein; and actuating discovered links in accordance with authorized client functionality in order to generate additional authorized client requests.

48. The computer program product according to claim 47, wherein the implemented method includes comparing discovered links to a filter and not generating authorized client requests for links matching the filter.

49. The computer program product according to claim 47, wherein the implemented method includes logging the client requests.

50. The computer program product according to claim 47, wherein, in the implemented method, said application interface elements are discovered by parsing at least one of the authorized client requests and server responses resulting therefrom.

51. The computer program product according to claim 50, wherein the implemented method includes analyzing the server responses in order to extract attributes of said application interface elements.

52. The computer program product according to claim 51, wherein, in the implemented method, the discovery of said application interface elements is based on a pre-defined set of detection rules.

53. The computer program product according to claim 52, wherein, in the implemented method, the generation of the unauthorized client requests is based on a pre-defined set of mutation rules.

54. The computer program product according to claim 53, wherein, in the implemented method, the evaluation of the attack results is based on recognition of a keyword in the results of the attack indicating an error in the application activity.

55. The computer program product according to claim 54, wherein the implemented method includes assigning each mutation rule a probability of success and scoring the results of said attack based on the probability of the corresponding mutation rule.

56. A computer program product comprising a computer readable medium having computer readable code embodied therein, the computer readable code, when executed, causing a computer to implement a method for detecting security vulnerabilities in a hypertext-based web application installed on a web server or web application server, the method comprising:

traversing the application in order to discover and actuate links therein;

analyzing messages that flow or would flow between an authorized client and the web server in order to discover elements of the application's interface with external clients and attributes of said elements;

generating unauthorized client requests in which said elements are mutated; sending the mutated client requests to the server; and receiving server responses to the unauthorized client requests and evaluating the results thereof.

57. The computer program product according to claim 56, wherein an application interface element is a path parameter.

58. The computer program product according to claim 56, wherein an application interface element is a data parameter.

59. The computer program product according to claim 56, wherein an application interface element is a cookie.

60. The computer program product according to claim 56, wherein, in the implemented method, the traversal over the application includes:

sending an authorized client request in order to receive a server response; parsing the response in order to discover links encapsulated therein; and actuating discovered links in accordance with authorized client functionality in order to receive authorized server responses from which additional authorized client requests can be generated.

61. The computer program product according to claim 60, wherein the implemented method includes comparing discovered links to a filter and not generating authorized client requests for links matching the filter.

62. The computer program product according to claim 60, wherein, in the implemented method, in the event the authorized client request requires user-interactive parameters, supplying pre-configured values therefor.

63. The computer program product according to claim 60, wherein, in the implemented method, in the event the authorized client request requires user-interactive selection of an option within a set of options, enumerating over all the options in order to generate a separate client request in respect of each option.

64. The computer program product according to claim 60, wherein the implemented method includes logging the authorized client requests.

65. The computer program product according to claim 64, wherein the implemented method includes logging the authorized sever responses.

66. The computer program product according to claim 60, wherein, in the implemented method, said application interface elements are discovered by parsing at least one of the authorized client requests and server responses resulting therefrom.

67. The computer program product according to claim 66, wherein the implemented method includes analyzing the server responses in order to extract attributes of said application interface elements.

68. The computer program product according to claim 67, wherein, in the implemented method, the discovery of said application interface elements is based on a pre-defined set of detection rules.

69. The computer program product according to claim 68, wherein, in the implemented method, the generation of the mutated client requests is based on a pre-defined set of mutation rules.

70. The computer program product according to claim 69, wherein, in the implemented method, the evaluation of the server response in reply to the mutated requests is based on recognition of a keyword in the results of the attack indicating an error in the application activity.

71. The computer program product according to claim 70, wherein the implemented method includes assigning each mutation rule a probability of success and scoring the results of the server response based on the probability of the corresponding mutation rule.

72. The computer program product according to claim 56, wherein the implemented method includes parsing the messages sent by the server for any suspicious code based on the recognition of pre-defined keywords and reporting the suspicious code.

* * * * *